March 15, 1955 — V. E. MATULAITIS — 2,704,205
HEATER
Original Filed Oct. 2, 1947
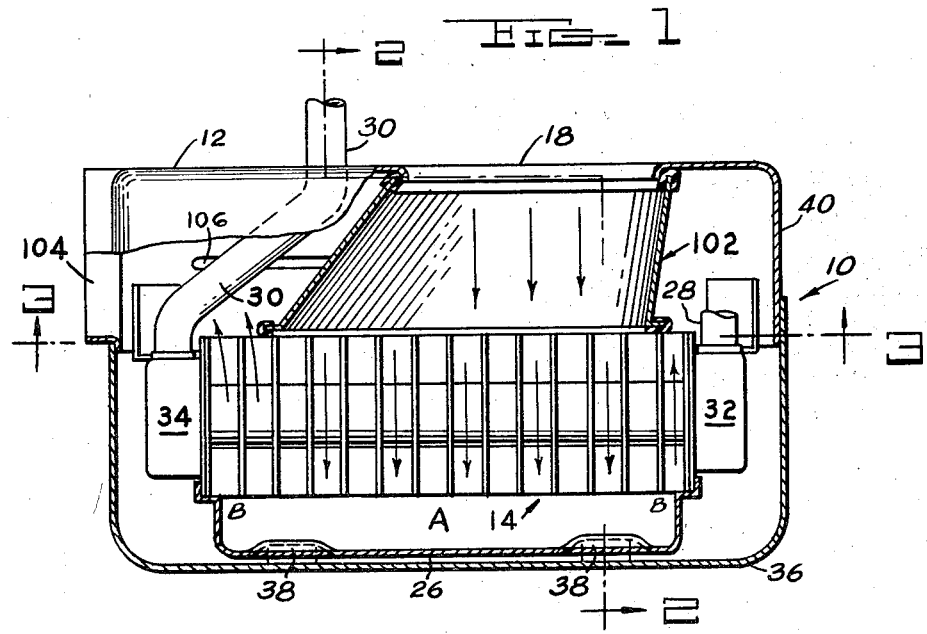
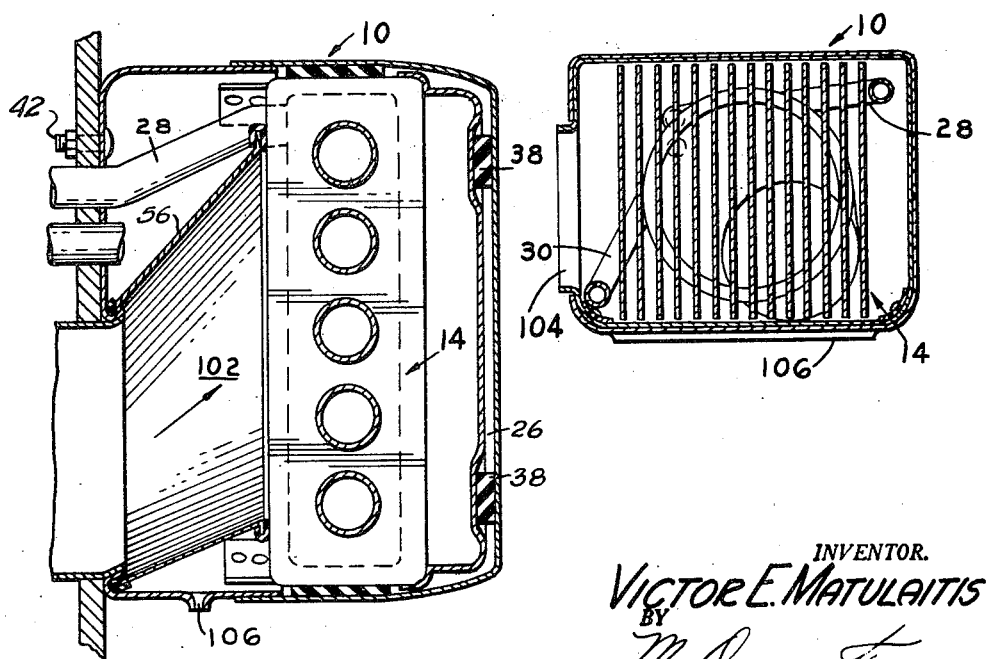
INVENTOR.
VICTOR E. MATULAITIS
BY
McDonald & Shapiro
ATTORNEYS

# United States Patent Office 2,704,205
Patented Mar. 15, 1955

2,704,205

HEATER

Victor E. Matulaitis, Franklin, Mich., assignor to Eaton Manufacturing Company, Cleveland, Ohio, a corporation of Ohio Original application October 2, 1947, Serial No. 777,507, now Patent No. 2,552,337, dated May 8, 1951. Divided and this application March 7, 1951, Serial No. 214,351

7 Claims. (Cl. 257—137)

This invention relates to heaters and more particularly to space heaters for automotive vehicles constituting a division of co-pending application Ser. No. 777,507, filed October 2, 1947, now Patent No. 2,552,337, dated May 8, 1951.

Broadly the invention comprehends the provision of a space for automotive vehicles and the like wherein the air delivered to the heater for distribution therefrom as heated air is double passed through the heater core thereof, that is the air is first passed through one section of the core, and raised in temperature and then it is baffled back through another section of the core to be further raised in temperature.

Although the development of space heaters for automotive vehicles has extended over a great number of years none has utilized the principle herein devised of double heating the air passed through the heater core in its continuous enclosed path of flow from entry to and exit from the heater wherein the air passage area throughout the heater and at its exit is at least equivalent to the air entrance area.

An object of the invention is the provision of an automotive vehicle space heater having means providing for the flow of inlet air through the heater core first through one section thereof and thence through a second section in a continuous path of flow so as to effectively raise the temperature of the air passed therethrough.

Another object of the invention is the provision of a space heater for automotive vehicles of the fresh air type providing means for effectively raising the temperature of the inlet air by double heating the air passed through the heater.

A further object of the invention is the provision of a heater for automotive vehicles wherein a dual pass heating arrangement is provided with the first pass being arranged substantially centrally of the second pass thereby eliminating cold radiation.

Other objects and advantages of the invention will appear from the following description taken in connection with the drawings, forming a part of the specification; and in which:

Fig. 1 is a partially cross sectionalized top plan view of a heater;

Fig. 2 is a cross sectional view taken substantially along line 2—2 of Fig. 1, and ;

Fig. 3 is a cross sectional view taken substantially along line 3—3 of Fig. 1.

The present invention was devised primarily for the purpose of providing a fresh air space heater for automotive vehicles or the like capable of effectively raising the temperature of the air passed therethrough without necessity of increasing the heater element or core size of the heater. This is accomplished by an effective arrangement of ducting whereby the air delivered to the heater is initially passed through a portion of the heater element or core and after its first heat rise is baffled and routed to another portion of the heater core for passage therethrough for a further heat rise thereof.

The heater ducting is arranged preferably so that the intake air will pass substantially centrally of the second stage heating of the air and in this way will derive heat from the second stage as well as eliminate any cold radiation on the exterior surface of the heater.

The air passage paths through the heater core in the double passing of the air therethrough are so constructed as to permit of the flow of air from the entry of the heater proper to the exit thereof without any appreciable velocity change and thereby assume the delivery of as ample a supply of heated air as required for efficient heating of the passenger compartment of the vehicle with which the heater is associated.

Referring to Figs. 1 through 3 for more specific details of the invention 10 represents generally a fresh air heater adapted for use in the heating of the passenger compartment of automotive vehicles or the like comprising a housing or case 12, incorporating a hot water heater core 14, thereon and having a blower unit (not shown) associated therewith in communication at the air inlet thereto.

The heater housing 12 having the heater core 14 therein has an air inlet opening 18, an air outlet or discharge opening 104 adapted to exit into the passenger compartment of a vehicle with which the heater is associated or a suitable air distributing apparatus, not shown, air inlet shrouding or ducting 102 extending from the air inlet opening 18 to a central portion of heater core 14 and an air baffle or shroud member 26 for effecting movement of the air after passage from the shrouding 102 through a central portion of the core, through that portion of the core situated in surrounding adjacent relation to the central portion of the core to the air discharge opening 104.

The heater core 14 is of conventional hot water construction and includes appropriate water inlet and outlet conduits 28 and 30 respectively and associated header members 32 and 34 respectively.

The core is so supported relative to the housing and shrouding 102 and baffle cover or shroud member 26 so as to be in the direct path of flow of air passing through shrouding 102 in the initial pass or heat rise stage of the air and the second pass or heat rise stage of the air after being directed by the baffle member 26 from zone A of the heater core through zones B thereof. Zone A is not shrouded or separated from zone B by any means and exists only because of the arrangement of the shrouding 102 and baffle 26 and the normal path of flow of air delivered to the heater from the blower unit.

The arrows shown by Fig. 1 of the drawings designate the direction and course of flow of the air in its passage through the heater from the shrouding 102 through to the discharge opening 104.

The baffle 26 of the heater is supported and spaced from one section 36 of the heater housing by bumper members 38 made of rubber or similar suitable material for holding the baffle cover firmly relative to the heater core.

The housing in addition to section 36 includes a section 40 which is fitted relative to housing section 36 to form a complete shrouding of the heater air passages and especially the air passage after the second pass thereof through heater core zone B and has discharge opening 104 thereon.

The heater 10 is of the type adapted to be mounted under the hood of the vehicle engine on the fire wall thereof and is provided with a suitable member 42 for supporting the heater upon the fire wall of the vehicle.

In viewing Figs. 1 and 2 of the drawings it is to be noted that the shrouding 102 is in the form of a channel of the shape of a frustum of a general cone and arranged centrally relative to the heater core having an angular wall section 56 providing for the free flow of air delivered thereto across the face of the heater core with which it is associated for heat transfer passage through the core zone A.

The baffle cover 26 is so arranged relative to the heater core as to permit free flow of the air through the core to be directed therein for subsequent delivery to zone B of core without causing any back pressure in the flow passage of the air through the heater from the entry to exit thereof.

The air outlet opening 104 of the heater 10 is arranged inside the passenger compartment and is adapted to be associated with an air distributor, not shown, arranged at one side thereof. In addition to the air outlet 104 another outlet opening 106 is provided at the bottom of the heater for air distribution toward the floor of the vehicle.

The heater 10 is so constructed that no cold radiation will occur because of the arrangement of the inlet air ducting centrally of the heater and the path of heated air after its passage through the second pass or heat rise stage. The blower of heater 10 can be suitably located wherever convenient relative to vehicle design or the like.

Heater 10 is so constructed that in the operational flow of air therethrough there will be no velocity changes and especially so with regards to the relative areas of the air inlet to the air outlets thereof wherein the air outlet is made greater than the area of the air inlet thereby eliminating any possibility of re-acceleration of the air flow.

Although the drawings are directed to the application of the principle of two pass air heating to fresh air heaters it is clearly conceivable that it is equally adaptable to recirculating heaters with the advantage that smaller heater cores could be provided for a like heat rise of conventional types of recirculating heaters.

While this invention has been described in connection with certain specific embodiments, the principle involved is susceptible of numerous other applications that will readily occur to persons skilled in the art. The invention, therefore is limited only as indicated by the scope of the appended claims.

What I claim is:

1. A heater adapted to be disposed within the body of a vehicle comprising a casing having a circular air inlet, and a plurality of air outlets, a heat exchange unit disposed within the casing, a truncated conical shroud member extending from communication with the air inlet in its entirety to a face of a circular central section of the heat exchange unit in substantially sealing engagement upon a face of the heat exchange unit for directing the air delivered to the air inlet through the central section of core in a direction away from the inlet opening and a cover member arranged on the other face of the core forming a chamber intermediate thereof adapted to receive the air delivered through the central section of the core and effective to direct the air through the outer section of the core and externally of the shroud member to the air outlets.

2. A vehicle heater comprising a casing having a circular air inlet opening and an air outlet opening, a heat exchange core disposed in the casing, a truncated cone shaped duct extending in increasing size from communication across the full open area of the inlet opening to communication with a central circular portion of one face of the core, and a cover member enclosing the full opposite face of the core providing therebetween an air chamber for the directing of air delivered thereto through a portion of the core adjacent to the portion with which the duct communicates, the exposed face of the core adjacent the duct having free air passage communication in the casing to the air outlet opening thereof.

3. A heater according to claim 2 wherein the air inlet and outlet openings in the case lie in planes perpendicular to one another.

4. A heater according to claim 2 wherein the air outlet opening is rectangular.

5. A heater according to claim 2 wherein the heat exchange core and cover member are yieldingly supported upon the inner walls of the casing.

6. A heater according to claim 2 wherein the duct communicates with approximately one-half the total face area of the core.

7. A heater according to claim 2 wherein the casing provides a chamber therein intermediate the outlet opening and the exposed face of the core adjacent the duct which completely surrounds the duct.

References Cited in the file of this patent
UNITED STATES PATENTS

| | | |
|---|---|---|
| 1,746,985 | Bates | Feb. 11, 1930 |
| 1,892,307 | Jordan | Dec. 27, 1932 |
| 2,552,337 | Matulaitis | May 8, 1951 |